(12) United States Patent
Bruhnke et al.

(10) Patent No.: US 8,919,971 B2
(45) Date of Patent: Dec. 30, 2014

(54) PLASTIC GLASS INTERIOR MIRROR WITH VARIABLE REFLECTIVITY

(75) Inventors: Ulrich Bruhnke, Ehningen (DE); Oliver Eder, Pinache (DE); Kurt Wilfinger, Affalterbach (DE)

(73) Assignee: SMR Patents S.a.r.l., Luxembourg (LU)

( * ) Notice: Subject to any disclaimer, the term of this patent is extended or adjusted under 35 U.S.C. 154(b) by 398 days.

(21) Appl. No.: 12/417,941

(22) Filed: Apr. 3, 2009

(65) Prior Publication Data

US 2009/0251785 A1 Oct. 8, 2009

(30) Foreign Application Priority Data

Apr. 3, 2008 (EP) .................................. 08103354

(51) Int. Cl.
*G02B 5/08* (2006.01)
*B60R 1/04* (2006.01)
*B60R 1/08* (2006.01)

(52) U.S. Cl.
CPC . *B60R 1/04* (2013.01); *B60R 1/083* (2013.01); *B60R 1/088* (2013.01)
USPC ............................ 359/604; 359/265; 362/494

(58) Field of Classification Search
USPC .......... 362/135–144, 494; 359/267–273, 602, 359/603, 608
See application file for complete search history.

(56) References Cited

U.S. PATENT DOCUMENTS

| | | | | |
|---|---|---|---|---|
| 5,303,130 | A | * | 4/1994 | Wei et al. ...................... 362/494 |
| 5,575,552 | A | * | 11/1996 | Faloon et al. ................. 362/492 |
| 6,152,587 | A | * | 11/2000 | Berg .............................. 362/494 |
| 6,193,379 | B1 | * | 2/2001 | Tonar et al. ................... 359/603 |
| 6,502,970 | B1 | * | 1/2003 | Anderson et al. ............. 362/494 |
| 7,012,729 | B2 | * | 3/2006 | Tonazzi et al. ................ 359/265 |
| 7,287,868 | B2 | | 10/2007 | Carter et al. |
| 2002/0093826 | A1 | * | 7/2002 | Bos et al. ...................... 362/494 |
| 2003/0169160 | A1 | * | 9/2003 | Rodriguez et al. ......... 340/426.1 |
| 2004/0196577 | A1 | | 10/2004 | Carter et al. |
| 2005/0276058 | A1 | * | 12/2005 | Romas et al. ................. 362/494 |
| 2005/0281043 | A1 | * | 12/2005 | Eisenbraun .................. 362/494 |
| 2007/0081350 | A1 | | 4/2007 | Huang |
| 2007/0139751 | A1 | | 6/2007 | Kuiper et al. |
| 2007/0272672 | A1 | * | 11/2007 | Oehmann ..................... 219/209 |
| 2009/0251913 | A1 | * | 10/2009 | Bruhnke et al. .............. 362/494 |

FOREIGN PATENT DOCUMENTS

| | | |
|---|---|---|
| DE | 2254511 | 11/1972 |
| DE | 3049169 | 12/1980 |
| EP | 1345071 | 9/2003 |
| WO | 03004245 | 1/2003 |
| WO | 2005096069 | 10/2005 |
| WO | 2008013499 | 1/2008 |

OTHER PUBLICATIONS

European Search Report for EP 08 10 3354 dated Dec. 3, 2008.

* cited by examiner

*Primary Examiner* — Derek S Chapel
(74) *Attorney, Agent, or Firm* — Reising Ethington P.C.

(57) ABSTRACT

The invention is related to an interior rear view mirror that is constructed by front plastic glass shaped in u-form and a mirror housing. The mirror comprises a second plastic glass which crate a inter glass space for a device which changes the reflectivity of the mirror.

9 Claims, 4 Drawing Sheets

PLASTIC GLASS INTERIOR MIRROR WITH VARIABLE REFLECTIVITY

BACKGROUND OF THE INVENTION

The invention is based on a priority patent application EP 08103354.0 which is hereby incorporated by reference.

The invention is related to an interior rear view mirror which is designed in plastic material and has smooth edges.

The interior rear view mirror has an internal cavity used for a device that influences reflectivity of the mirror.

STATE OF THE ART

Interior rear view mirrors are defined e.g. by the regulations of ECE 324 Regulation 46. An interior rear view mirror faces a couple of requirements as the field of vision which must be at least a 20 m wide flat horizontal portion of the road. One of the requirements is related to the passenger security and requests that the edges of the interior rear view mirror must be rounded to a radius not less than 2.5 mm.

In result of this requirement the interior rear view mirror known in the art often shows designs with a plastic mirror case defining a front opening. The front opening includes the reflecting glass which is fixed by a retaining bezel. The retaining bezel is form of plastic material to fulfill safety requirement and the minimum radius of the regulations.

The appearance of the interior rear view mirror with the bezel surrounding the reflecting element is not satisfying some design request.

It is know in the art by DE 3049169 to form a plastic glass for an interior rear view mirror. The plastic glass is snapped into place and is tightly connected to the mirror housing. The plastic glass is coated with a reflecting layer on the inner surface of the mirror.

It is also known in the art from U.S. Pat. No. 7,287,868 to install a dimmable device in an interior rear view mirror. In prior art the dimmable element is produced separately and installed in the mirror housing with a mirror subassembly. The subassembly curls around the edge of the glass element and engages the front surface of the glass element.

SUMMARY OF THE INVENTION

The inventive interior rear view mirror consists of mirror housing and one piece plastic glass front plastic glass combined with a second plastic glass creating a inter glass space. The fully transparent front plastic glass is molded in one piece and designed to have two side pieces for the fixation of the second plastic glass. The interior rear view mirror according the invention allows a very simple mirror design including three main parts: the mirror housing and the unshaped front plastic glass and the second plastic glass. The transparent plastic glass is combining the function of the mirror glass with variable reflectivity and the mirror housing with smoothed edges.

With the interior rear view mirror according the invention a light weighted mirror is created. The high flexibility of molded plastic glass allows a lot of different bezel free designs of the interior rear view mirror.

DETAILED DESCRIPTION OF EMBODIMENTS

Figure 1:
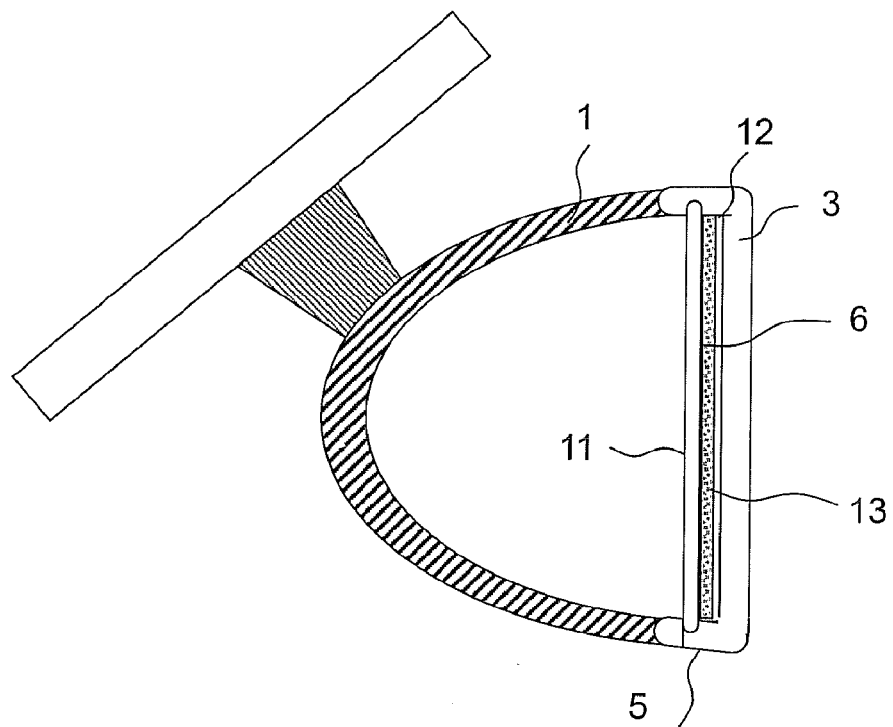
FIG. 1 shows one example for variable reflectivity

FIG. 1 is an embodiment of an interior rear view mirror including a variable reflectivity function. The mirror housing 1 is connected to a front plastic element 3 which forms a closed cavity for all electric and electronic devices. The front plastic element 3 and a second plastic element 11 form an internal inter-element space 12. The internal inter-element space 12 hosts either the reflective layer or a device 13 able to adapt the reflectivity. In another embodiment the reflective layer 6 covers the side of the second plastic element 11 lying outside the inter-element space 12. The plastic elements 2, 11 and inter-element space 12 may also be commonly referred to as plastic glass 2, 11 and inter-glass space 12.

The front plastic glass is molded in a U shaped form with two side pieces 5 covering a part of the mirror assembly. The front plastic glass 3 and the mirror housing are connect by any method known in prior art as welding or gluing.

The process to mould the plastic glass is published in the EP 1412158.

The process includes the steps of first providing an injection mould machine. The injection molding machine includes a cavity therein, for forming a transparent plastic article simulating the transparency of glass. The mould includes a pressure sensing and regulating apparatus. The mould is thereafter closed and a clear plastic material is injected into the mould through a port. A portion of the mould is used to pressurize the mould material back into the injection port. After the material is partially injected back into the injection port, the mould is held at a predetermined pressure for optimizing optical properties of the plastic material, to provide a clear transparent plastic material which has optical properties similar to glass.

In the device there is provided a first mould platen and a second mould platen. The first mould platen includes the cavity for production of the final finished part. A second movable piston portion is provided, which includes a cavity, which is adjustable by movement of the piston. The pressure in cavity is adjusted by way of the hydraulic smaller control piston, which is set forth for use in a control system, which hydraulically can compress or adjust the hold position of the moveable portion. A proportional valve may be utilized in the control system for controlling the adjustment of the pressure in the mould cavity. A pressure sensor is utilized to determine the pressure in the cavity, for purposes of the hold pressure in the subject process. After this, the proper pressure is determined and the mould cavity is held at this pressure by way of the control system linked to the proportional valve.

Figure 2:
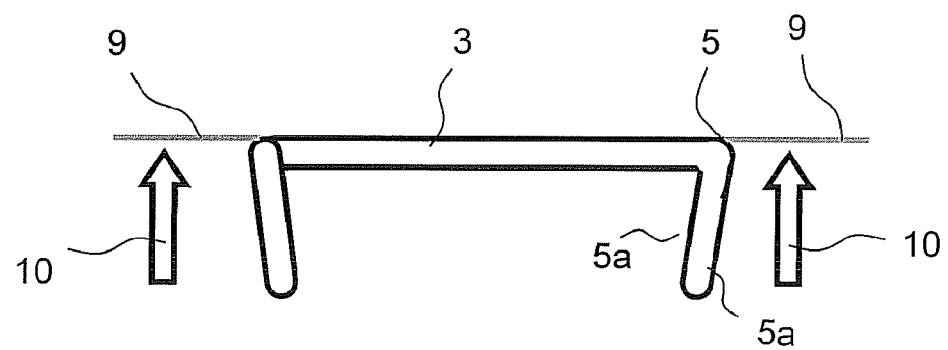
FIG. 2 shows deforming of an embodiment

Referring to the example of FIG. 2, there is shown a sample mirror in which various contours of the mirror can be presented as may be desired. This gives options which were hard to create using glass type mirrors or the like. The design as shown in FIG. 2 has an adjacent rim 9 which is molded together with the plastic glass element 3.

The rim 9 is used as a "lost" part. During the deform process ejectors 10 eject the article via these rims. Afterwards the rims are cut off. With a solution like this the appearance of piston and ejector stamps on the transparent plastic glass is avoided. A design as shown in FIG. 2 shows a drip mould which means that the molding form must include movable pistons and pins to remove the article form cavity.

It is not necessary to have an angle smaller than 90 degrees between the front plate surface and the two side pieces. To ease the molding process also an 90 degree angel is possible.

Preferably, the mould is held at a pressure of generally from about 900 bar to about 1800 bar preferably from about 1000 to about 1800 bar and preferably from about 1000 to about 1200 bar.

It has been found that by using these steps, a glass-like transparency can be obtained. Utilizing these steps helps relieve internal tension in the material therefore removing barriers to optical clarity which otherwise might arise.

Mould temperatures vary depending on the material used. Typically, suitable temperatures are from about 80 to 120-[deg.] C. A most preferred temperature of about 80-[deg.] C. is utilized in the process.

Typical plastics used in the present invention include optical grade injection moldable material, optical grade polycarbonates, methacrylates or methacrylate modified polycarbonates. Suitable materials are obtainable from General Electric, for instance, plastics sold under the trade designations MAKROLON 2207 and LEXAN LSI are particularly suitable in processes of the present invention. Also, it is necessary to provide optical quality polished mould surfaces to maintain the optical properties of the finished part. The optical surface can be restricted to the plane part of the reflective element. The side pieces of the front plastic glass can be designed to appear like frosted glass.

The surface 5a as shown in FIG. 2 is the surface through which illuminating light is emitted. The frosted glass effect achieved by a different structured surface in the molding tool emits a smooth light.

To form read lamps the lenses of this read lamps A are also molded directly by structuring the tool. Therefore a Fresnel lens can be produced in the same molding step.

Subsequent heat treatment of the part which may occur due to protective or reflective coatings which may be applied do not detrimentally affect or degrade the mirrors of the present invention. This is due to the step of maintaining the part under the pressures specified at molding temperature. Generally, dwell times at temperature are from about 0.1 to 60 seconds. Typical dwell times at temperature are from about 10 to 50 seconds, with preferred dwell times being from about 18 to 25 seconds. Because the plastic is allowed to harden at an elevated temperature and pressure, subsequent treatments requiring heat, such as adding reflective coatings, do not adversely affect the optical properties of the plastic.

Figure 3:
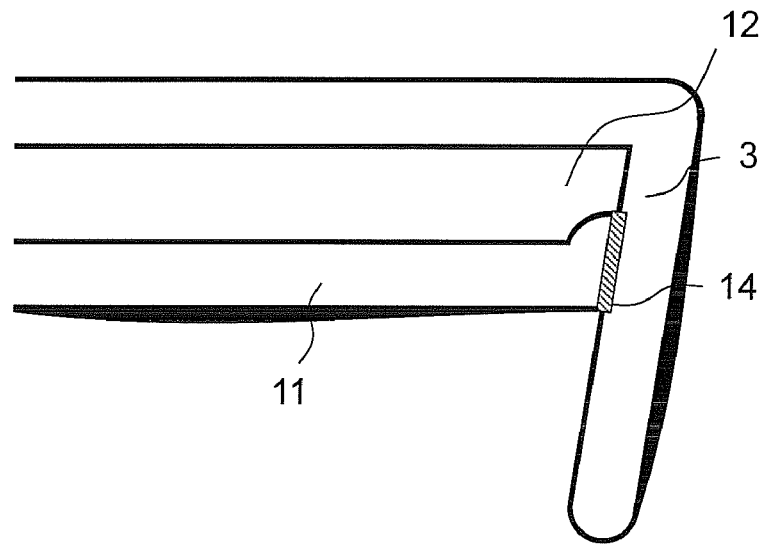
FIG. 3a to 3c show different embodiments of variable reflective solutions
Figure 3:
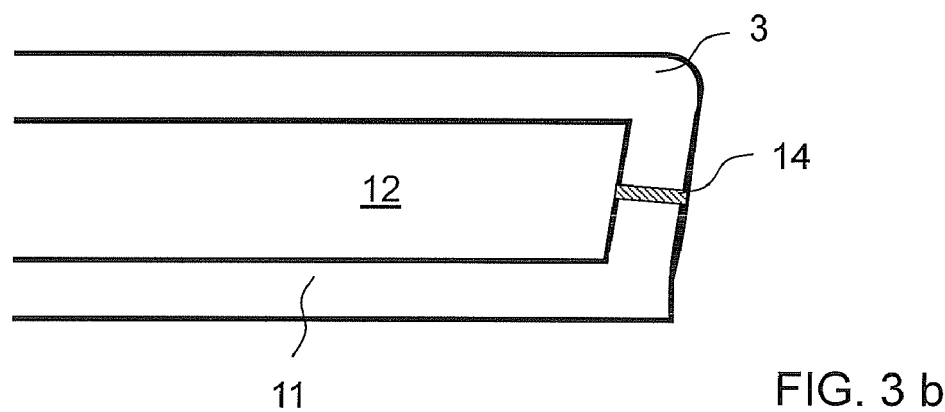
Figure 3:
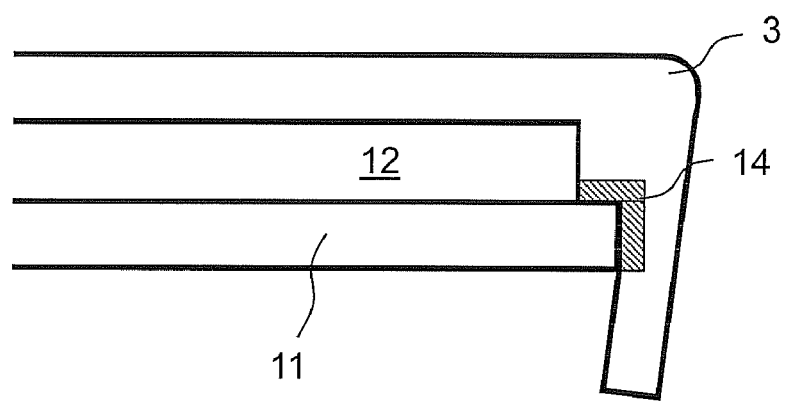

To create the inter-glass space 12 the two plastic glass plates of the FIG. 3a to c are combined in different ways. FIG. 3a shows a solution wherein the second plastic glass 11 has a swelling end attached to the front plastic glass 3. The swelling end can have a form as schematically shown in FIG. 3a or fill the whole internal edge of the U-formed front plastic glass. Connections mean 14 between the two parts must realize three functions: the electrical isolation for the different devices for reflectivity adaptation and the electrical connection of all electrodes to drive the device. The connection mean 14 must also connect the plastic glass sheets stable and dense. FIG. 3b shows an example with a butt joint connecting two u-shaped plastic glass pieces together and again the connection mean 14.

FIG. 3c shows an example with a support structure.

For adapting reflectivity several systems are known in prior art.

One example is adaptation by an electro wetting element. As described in US 2007/139751 a variable mirror comprises: a fluid chamber; an optical axis extending through at least a portion of the fluid chamber; a first polar and/or conductive fluid and a second fluid in contact over an interface extending transverse the optical axis, the fluids being substantially immiscible; an interface adjuster arranged to alter the configuration of the interface via the electro wetting effect; and wherein the interface comprises a reflective material. Electro wetting is a way to influence reflectivity. In one status of the device the fluid is covering each pixel of the device. Applying a power the fluid agglomerate to a droplet in one edge of the pixel and the full reflectivity is achieved.

Figure 5:
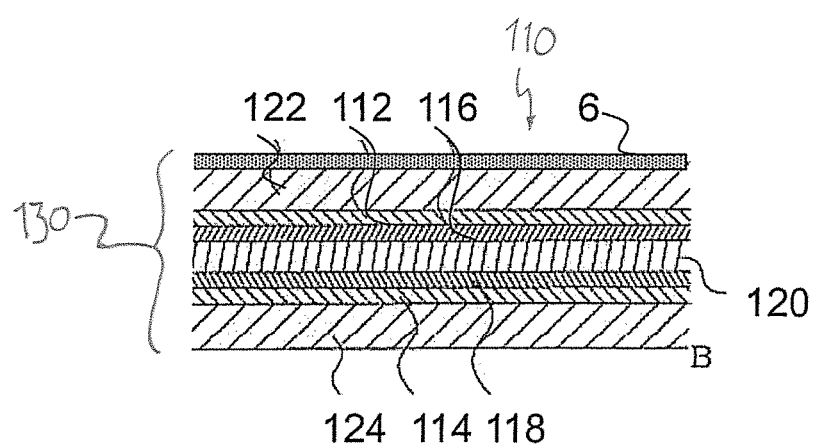
FIG. 5 shows a second example of variable reflectivity device

Another example is disclosed in WO08/013,499. FIG. 5 illustrates a typical configuration of an electrochromic device 110. In the centre part, an ion conductor, i.e. an electrolyte layer 120 is provided. The electrolyte layer 120 is on one side in contact with an electrochromic layer 116, capable of conducting electrons as well as ions. On the other side of the ion conductor 120 is an electron and ion conducting counter electrode layer 118, serving as an ion storage layer. This counter electrode film 118 may entirely or partly be constituted by a second electrochromic film. The central three-layer structure 116, 118, 120 is positioned between electron conducting layers 112, 114. The electron conducting layers 112, 114 are arranged against outer substrates, in the present invention a first 122 and a second 124 plastic substrate. The stack of the plastic substrates 122, 124 and the central five layers 112, 114, 116, 118, 120 forms an electrochromic laminate sheet 130. The plastic substrates are the front plastic glass and the second plastic glass in our invention.

Such an electrochromic device 110 is colored/bleached by applying an external voltage pulse between the electron conducting layers 112, 114 on the two sides of the stack 130, causing the electrons and ions to move between the electrochromic layer 116 and the counter electrode layer 118. The electrochromic layer 116 will thereby change its colour. Non-exclusive examples of electrochromic layers 116 are cathodically colouring thin films of oxides based on tungsten, molybdenum, niobium, titanium, lead and/or bismuth, or anodically colouring thin films of oxides, hydroxides and/or oxy-hydrides based on nickel, iridium, iron, chromium, cobalt and/or rhodium.

At least one of the plastic substrates 122, 124 has to be transparent, in order to reveal the electrochromic properties of the electrochromic layer 116 to the surroundings. In a typical case today, plastic substrates are used. In the most general sense, a plastic substrate 122, 124 is a synthetic or semisynthetic polymerization product. The plastic substrate is commonly classified by its polymer backbone. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers Also at least one of the two electron conducting layers 112, 114 must be transparent. Non-exclusive examples of electron conductors 112, 114 transparent to visible light are thin films of Indium Tin oxide (ITO), Tin oxide, Zinc oxide, n- or p-doped Zinc oxide and Zinc oxyfluoride. Metal-based layers, such as ZnS/Ag/ZnS and carbon nanotube layers have been recently explored as well. Depending on the particular application, one or both electron conductor layers 112, 114 may be made of a metal grid. To complete the device one substrate layer 122 or 124 is coated with a reflective layer. Alternative to that embodiment the reflective layer 6 is placed between the conducting layer 112 and the electrochromic layer 116.

Figure 4:
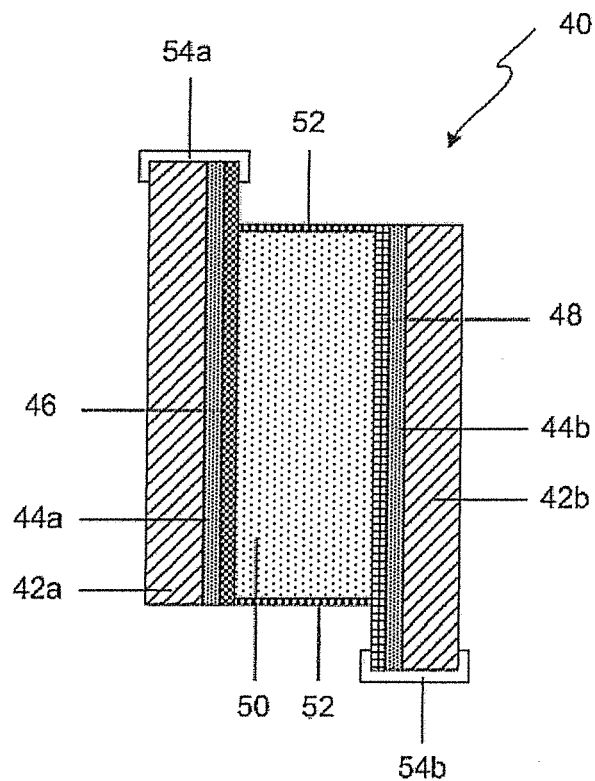
FIG. 4 shows a first example of variable reflectivity device

Another example of a device adapting reflectivity is shown in FIG. 4. The device 40 includes a first electrochromic substrate. The first electrochromic substrate includes a transparent substrate 42a, typically a glass or plastic substrate. The substrate 42a is coated with a transparent layer 44a of inorganic conductive material, such as a layer of indium-tin oxide (ITO) to form a conductive substrate. A polyaryl or polyheteroaryl electroactive polymer film 46 formed in accordance with the present invention is coated over the layer of inorganic conductive material 44a. The electroactive polymer film 46 may be formed from PEDOT according to any one of the processes of the present invention and is cathodically coloring and forms the cathode of the device 40.

A second electrochromic substrate (which may or may not be formed in accordance with a process of the present invention) includes a transparent substrate 42b, typically a glass or plastic substrate, and a transparent layer 44b of inorganic conductive material, such as a layer of indium-tin oxide (ITO) to form a conductive substrate. An electroactive polymer film 48 is coated over the layer of inorganic conductive material 44b. The electroactive polymer film 48 is prepared using any suitable method, including solution coating, vapour phase polymerisation, or electrochemical coating. The electroactive polymer film 48 is anodically coloring and formed from polypyrrole, polyaniline or a derivative thereof, such as polymethoxyaniline-5-sulfonic Acid (PMAS). It is also contemplated that other electrochromic polymers or metal oxides be used to form the electroactive polymer film 48. The electroactive polymer film 48 forms the anode of the device 40.

The polyaryl or polyheteroaryl electroactive polymer film 46 and the electroactive polymer film 48 are selected to have a combined absorption spectrum which is maximum across the visible spectrum when an electric potential is applied between the films. When a reverse electric potential is applied between the films they have a combined absorption spectrum which is minimum across the visible spectrum. As each of the electrochromic polymer films is substantially transparent, the colour change is visible to a user.

An ion conducting layer 50 of an electrolyte is interposed between the polyaryl or polyheteroaryl electroactive polymer film 46 and the electroactive polymer film 48. The ion conducting layer 50 may be a solid polymeric electrolyte, such as a copolymer of ethylene oxide and methyl glycidyl ether or butylene oxide, or a polyurethane, each of which contains at least one ionisable salt. The ion conducting layer 50 could also be a liquid electrolyte. Ionic liquids such as 1-ethyl-3-methyl imadozolium bistrifluoromethane sulfonamide are suitable.

The ion conducting layer 50 is held between the polyaryl or polyheteroaryl electroactive polymer film 46 and the electroactive polymer film 48 by forming seals 52 therebetween. The electrochromic substrates and ion conducting layer 50 do not have to completely overlap, even though some overlap is needed for electric and/or ionic current to pass between them. Thus, the electrochromic substrates can be displaced with respect to one another. This allows for electrical contacts 54a and 54b to be connected to each substrate.

In use, the application of a voltage differential between the electrochromic substrates causes the migration of ions from one electrochromic polymer film, through the ion conducting layer, and into the other electrochromic polymer film, thereby causing each of the electrochromic polymer films to become either bleached or coloured. Thus, when a voltage is applied, the electrochromic substrate containing electroactive polymer film 48 is polarised positive (anode) and the electrochromic substrate containing polyaryl or polyheteroaryl electroactive polymer film 46 is polarised negative (cathode), whereupon an electric field is induced in the ion conducting layer 50. This causes oxidation of the polyaryl or polyheteroaryl electroactive polymer film 46 and reduction of the electroactive polymer film 48. The extent of the color change is dependent on the voltage applied and the specific materials used.

Another possibility to influence reflectivity directly is disclosed in European Patent EP1345071. A switchable mirror material comprises a magnesium thin film having a thickness of 40 nm or less, or a magnesium-nickel alloy thin film having an alloy composition represented by MgNix ($0.1<x<0.3$), a transparent catalyst layer formed on a surface of the magnesium-containing thin film, and a transparent protective layer optionally formed on the catalyst layer. The switchable mirror material has a chromic property which allows the thin film to be switched from a mirror state into a transparent state by means of hydrogenation of the thin film at about 20 DEG C., and to be switched from the transparent state into the mirror state by means of dehydrogenation of the thin film in the range of about 20 DEG C. to 100 DEG C. The switchable mirror glass having a surface formed with the switchable mirror material.

The mirror according the invention is able to perform another function. The mirror is lighted and illuminate areas adjacent to the mirror.

Figure 6:
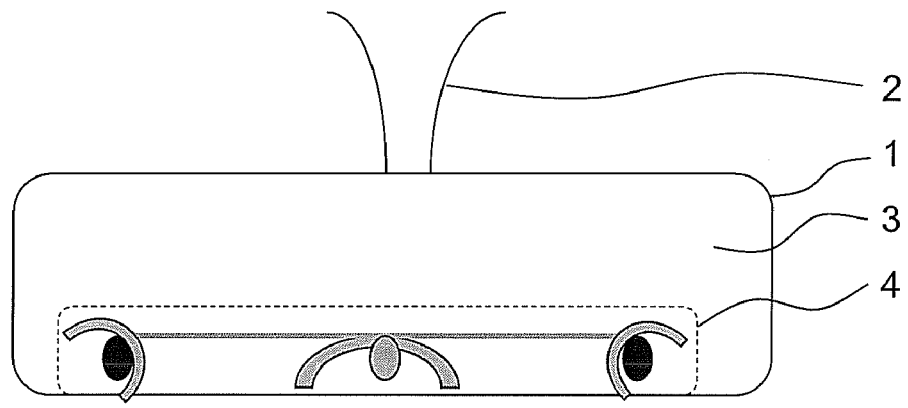
FIG. 6 interior rear view mirror with a schematic illumination

FIG. 6 shows schematically an interior rear view mirror from the front side. A mirror housing 1 is attached to a mirror base 2 which is connected to vehicle roof or wind screen. The mirror housing 1 has an opening to the interior of the vehicle in which front plastic glass 3 is inserted.

Behind the front plastic glass 3 in the mirror housing a light module 4 is installed either at the backside or the base side of the mirror housing.

Figure 7:
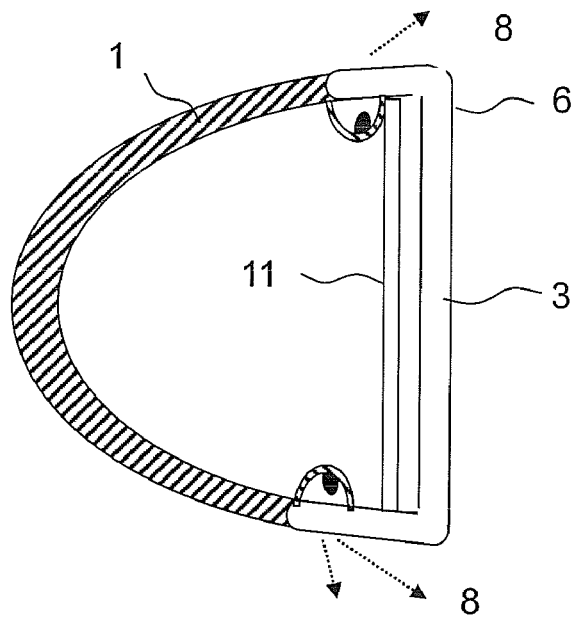
FIG. 7 shows a cross section of the interior rear view mirror with illumination

FIG. 7 is a cross section of the interior mirror of FIG. 6. The mirror housing 1 and the front plastic glass 3 form a closed cavity in which the electrical and or the electronically elements and circuits are placed. As an example a part of a light module 4 is shown in the cavity. The front plastic glass forms the front plate of the interior mirror and has a side piece 5 forming together a U-form. The edges are smoothed to follow the regulations and design rules. It is possible to have thick front plastic glass with a radius which is much more than the regulations requests. The front plastic glass 3 is one piece closing the front and the base of the interior rear view mirror.

This means that the section between the non transparent mirror housing 1 and the front plastic glass 3 remains transparent and emits light if light module in the mirror housing is activated. This edge illumination is sketched with arrows 8. Also within the side pieces 5 light is emitted through the transparent reflective element.

The invention claimed is:

1. A rear view mirror assembly comprising:
   a non-transparent mirror housing;
   a front plastic element being optically transmissive, and closer to a user than the non-transparent mirror housing, said front plastic element defining a front face surface and a front face side piece in U-shaped configuration in cross section, wherein said front face side piece extending out to a rounded edge with said front face side piece extending beyond said rounded edge to engage said non-transparent mirror housing such that said front plastic element is a single piece that closes said non-transparent mirror housing;
   a second plastic element fixedly secured to said front plastic element to create an inter-element space, said second plastic element including a surface with a reflective layer covering said surface of said second plastic element;

a light module disposed within a cavity formed by said mirror housing and said front plastic element behind said second plastic element and adjacent said front plastic element in an orientation such that said light module emits light out through only said front face side piece for edge illumination away from said front face surface of said front plastic element and said reflective layer of said second plastic element; and means for adaptively modifying reflectivity of said rear view mirror assembly.

2. A rear view mirror assembly according to claim 1 wherein said reflective layer covers said surface of the second plastic element outside said inter-element space.

3. A rear view mirror assembly according to claim 1 wherein said means for adaptively modifying reflectivity of said rear view mirror assembly is an electro-wetting cell.

4. A rear view mirror assembly according to claim 1 wherein said means for adaptively modifying reflectivity of said rear view mirror assembly is an electrochromic device.

5. A rear view mirror assembly according to claim 4 wherein said electrochromic device is polymer chemical material set with ionic liquid as electrolyte substance.

6. A rear view mirror assembly as set forth in claim 4 wherein the electrochromic device is a solid chemical material set.

7. A rear view mirror assembly according to claim 1 wherein said front face side piece extends around a periphery of said front face surface.

8. A rear view mirror assembly according to claim 1 wherein the means for adaptively modifying reflectivity of said rear view mirror assembly includes a reflective layer of a switchable mirror material based on hydrogen absorbance.

9. A rear view mirror assembly according to claim 1 wherein said light module has at least two light emitting diodes (LEDs) illuminating areas adjacent to the mirror.

* * * * *